No. 747,462. PATENTED DEC. 22, 1903.
H. H. MOHLER.
CANE STRIPPER AND HEADER.
APPLICATION FILED JUNE 3, 1901.
NO MODEL. 2 SHEETS—SHEET 1.

Witnesses
C. N. Woodward.
J. W. Garner.

H. H. Mohler, Inventor
By C. A. Snow & Co.
Attorneys

No. 747,462. PATENTED DEC. 22, 1903.
H. H. MOHLER.
CANE STRIPPER AND HEADER.
APPLICATION FILED JUNE 3, 1901.
NO MODEL. 2 SHEETS—SHEET 2.
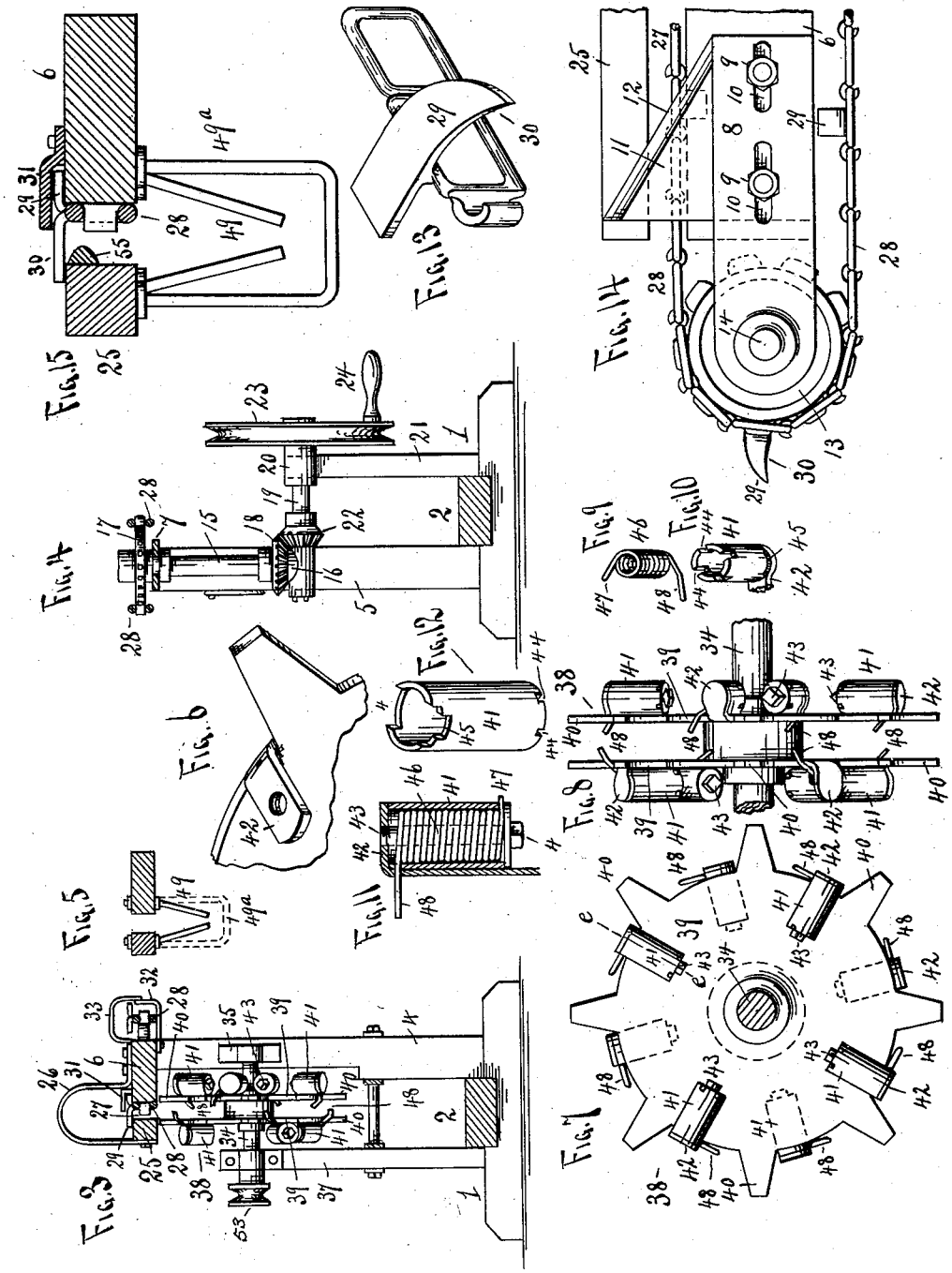
Witnesses
C. H. Woodward
J. W. Garner
H. H. Mohler, Inventor
By C. A. Snow & Co.
Attorneys No. 747,462. Patented December 22, 1903.

UNITED STATES PATENT OFFICE.

HARVEY H. MOHLER, OF KNOBNOSTER, MISSOURI.

CANE STRIPPER AND HEADER.

SPECIFICATION forming part of Letters Patent No. 747,462, dated December 22, 1903.

Application filed June 3, 1901. Serial No. 63,017. (No model.)

*To all whom it may concern:*

Be it known that I, HARVEY H. MOHLER, a citizen of the United States, residing at Knobnoster, in the county of Johnson and State of Missouri, have invented a new and useful Cane Stripper and Header, of which the following is a specification.

My invention is an improved cane stripper and header for stripping the blades from the stalks and cutting off the heads of sugarcane; and it consists in the peculiar construction and combination of devices hereinafter fully set forth and claimed.

Figure 1:
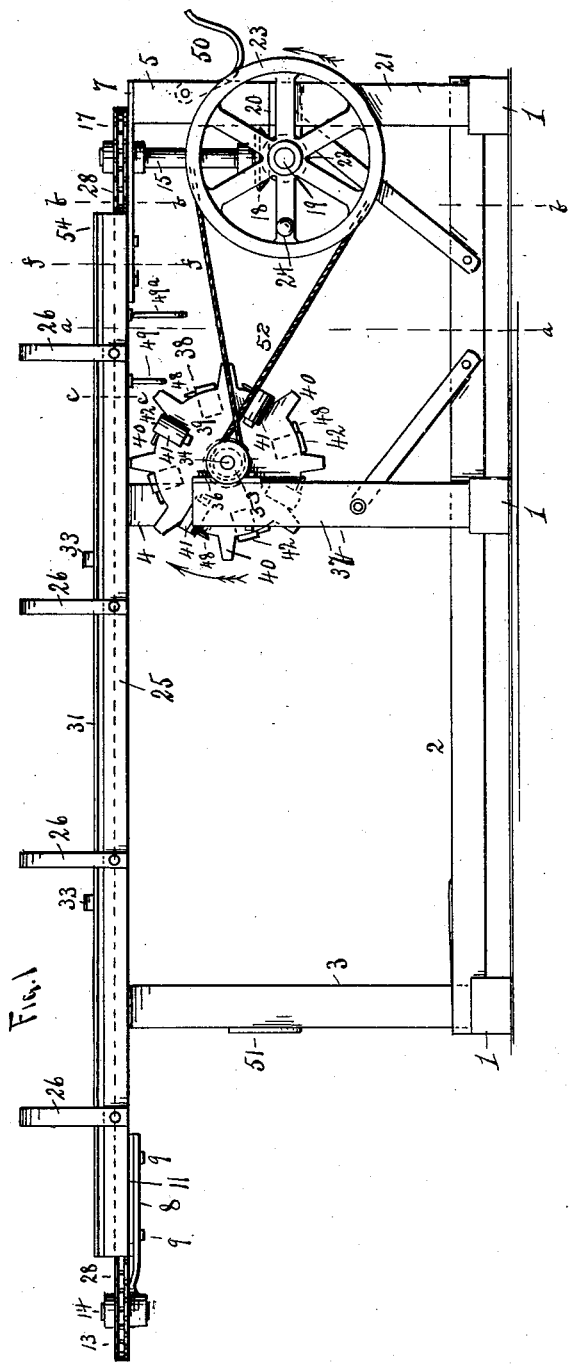
Figure 2:
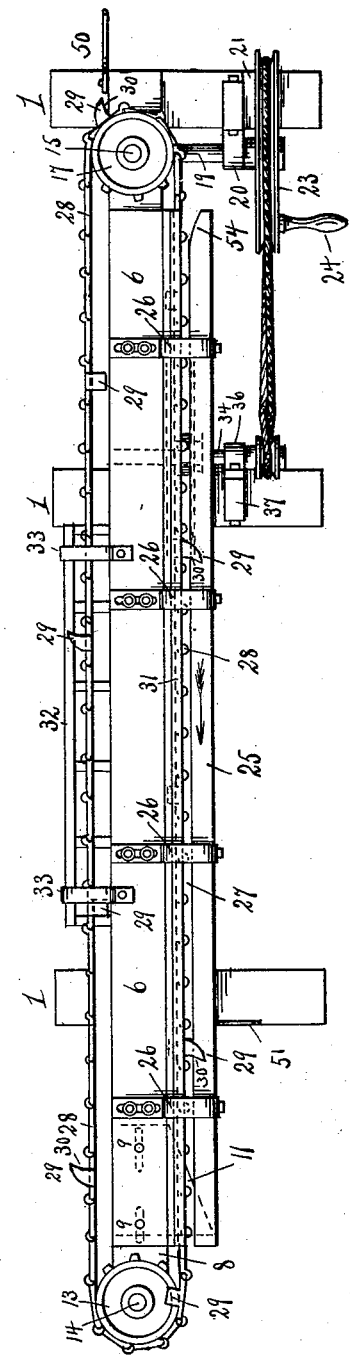

In the drawings, Figure 1 is a side elevation of a cane stripper and header constructed in accordance with my invention. Fig. 2 is a top plan view of the same. Fig. 3 is a vertical sectional view of the same, taken on a plane indicated by the line $a\ a$ of Fig. 1. Fig. 4 is a similar view on line $b\ b$ of Fig. 1. Fig. 5 is a detail section taken on a plane indicated by the line $c\ c$ of Fig. 1. Fig. 6 is a detail perspective view showing a portion of the stripper. Fig. 7 is a detail side elevation of the stripper-head. Fig. 8 is an edge elevation of the same. Fig. 9 is a detail perspective view of one of the stripping-springs. Fig. 10 is a detail inverted perspective view of the casing therefor. Fig. 11 is a detail sectional view taken on a plane indicated by the line $e\ e$ of Fig. 7. Fig 12 is a detail perspective view of a cylindrical casing for one of the spring stripping elements. Fig. 13 is a detail perspective view of the carrier-chain. Fig. 14 is an inverted plan view showing the heading-knife, the adjustable bearing-plate, the adjustable sprocket-wheel, and a portion of the carrier-chain. Fig. 15 is a detail sectional view taken on the plane indicated by the line $f\ f$ of Fig. 1.

In the embodiment of my invention I provide a suitable frame, which may be of any suitable construction. In the form of my invention here shown the construction of the frame is as follows: On transversely-disposed feet 1 is secured a base-bar 2. Standards 3, 4, and 5 rise from the said feet 1 on one side of said base-bar. A longitudinally-disposed bar 6 is secured on the upper ends of the standards 3 4. One end of the said bar 6 extends nearly to the standard 5. A bearingplate 7 is secured on the upper end of the standard 5 and to the under side of the bar 6. At the outer end of said bar 6 is an adjustable bearing-plate 8, which is secured to the said bar by bolts 9, that operate in adjusting-slots 10, with which said bearing-plate is provided. A heading-knife 11 is secured between the bar 6 and the adjustable bearing-plate 8 by the said bolts 9. The said heading-knife is a plate which has a diagonally-disposed cutting edge 12, that projects beyond one side of the bar 6, as is shown in Figs. 2 and 14. A sprocket-wheel 13 is journaled on a spindle 14 on the adjustable bearing-plate 8. A vertical shaft 15 is journaled in the bearingplate 7, and the lower end thereof is stepped in a bearing 16, which is secured to the standard 5. At the upper end of the said shaft is a sprocket-wheel 17. At the lower end thereof is a beveled gear-wheel 18. A horizontally-disposed power-shaft 19 is journaled in the bearing 16 and is also journaled in a bearing 20 at the upper end of a standard 21, which is disposed opposite the standard 5. Said power-shaft has a beveled gear-wheel 22, which engages the gear 18, and is further provided with a pulley 23. Power may be applied to the shaft 19 by any suitable means and from any suitable motor—as a horsepower, steam-engine, or the like; but in the drawings I show a crank 24, by which the said pulley 23 may be turned, and thereby caused to turn said shaft 19.

A longitudinally-disposed guide-bar 25 is supported directly opposite the front side of the bar 6, at a suitable distance therefrom, by a series of arch-bars 26. Thereby a runway 27 is formed between the bar 6 and the guidebar 25. An endless sprocket-chain, which I will hereinafter refer to as a "carrier-chain" 28, connects the sprocket-wheels 13 17. The front lead of the said carrier-chain travels in the runway 27 in the direction indicated by the arrows in Fig. 2 of the drawings. The rear lead of said carrier-chain travels in rear of the bar 6. Certain of the links of the carrier-chain at suitable distances apart are provided on their upper sides with cross-heads 29, which project in opposite directions therefrom. The forward extending ends of the said cross-heads are formed into hooks 30, and the said hooks extend across the runway 27 and bear and travel upon the guide-bar 25. The oppositely-extended ends of said cross-heads bear and travel upon the rear side of the bar 6. A plate 31 forms a housing which covers the upper side of the front lead of the carrier-chain and is secured on the bar 6. The said housing-plate also forms a guide-way for the rearward extended ends of the cross-heads 29 on the front lead of the carrier-chain. The rear lead of the carrier-chain is prevented from sagging by a horizontally-disposed supporting-bar 32, which is supported by spanners 33, that connect it to the bar 6.

A horizontally-disposed shaft 34 is journaled in a bearing 35 on the standard 4 and in a bearing 36 on a standard 37, which is disposed opposite said standard 4. On the said shaft, directly below the runway 27, is secured a revoluble stripper 38, which comprises a pair of disks 39, which are suitably spaced apart and are provided with peripheral projecting spurs 40. On the outer sides of the said disks 39, at suitable distances apart, are cylindrical casings 41. Portions of the disks 39 intermediate of the spurs 40 are outturned, as at 42, to form the outer ends of caps of said casings. The latter are secured to said caps by screws 43. In the inner ends of said cylindrical casings are notches 44 and in the upper ends thereof on their inner sides are openings 45. Coiled springs 46 are disposed in said cylindrical casings on said screws 43. Their lower ends are outturned, as at 47, and disposed in appropriate openings 44, and their upper ends are inturned, as at 48, and caused to project into the space between the disks 39 and disposed in the openings 45. The said projecting ends 48 of the springs form the strippers, which when the shaft 34 is in rotation strip the leaves from the stalk of a plant that is passed between the said disks 39. The stripping-fingers 48 are by the springs 46 permitted to yield when they encounter an obstruction which they cannot overcome, and are hence prevented from being broken when the machine is in operation. The springs 46 may be adjusted to any desired tension by disposing their projecting inner ends 47 in appropriate adjusting-openings 44. At a short distance in advance of the revoluble stripper are a pair of depending guides 49, which converge downwardly, as shown, and are respectively attached to the bar 6 and the guide-bar 25. It will be understood that said guides 49 are disposed in the same vertical plane with the revoluble stripper and the runway 27.

A supporting-arm 50, which may be of any suitable form, is attached to the standard 5 and serves to support a bundle of cane at the feed end of the machine. A similar arm 51 is secured to the standard 3 and disposed transversely under the runway 27 in a position to receive the stalks of the cane after the leaves have been stripped therefrom and the heads cut off by the header-knife 11.

The operation of my invention is as follows: The power-shaft 19 being revolved in the direction indicated by the arrow in Fig. 1, power is conveyed from the pulley 23 to the stripper 39 by a crossed belt 52, which connects said pulley 23 to a pulley 53 on said shaft 34. Hence the revoluble stripper is caused to rotate in a reverse direction to the movement of the front lead of the carrier-chain, as is indicated by the arrows in Fig. 1. The stalks of the cane are placed manually one at a time in an upright position in the feed end of the runway 27 (indicated at 54 in Fig. 2) and in such a position that the portion of the said stalks just below the heads or seed ends thereof shall be caused to be engaged by the hooked cross-heads on the front lead of the carrier-chain, the latter in coaction with the guide-bar 25 serving to carry the cane with the chain through the guideway 27. A loop 49$^a$ in advance of guides 49 serves to keep the cane up and in proper position as it approaches the revoluble stripper, the guides 49 causing the stalks to be fed between the disks of the revoluble stripper and drawn longitudinally between the same. The spurs 40 of the disks of the revoluble stripper strip off the leaves that project at an angle from the stalks, and the spring stripping-fingers serve to effectually strip off the leaves that lie closely to and are parallel with the stalks as the latter are drawn over the revoluble stripper between the disks thereof. The stripped stalks are carried by the carrier-chain to the heading-knife, the latter serving to cut the heads from the stripped stalks, as will be understood. The stalks after being thus stripped and headed drop by gravity on the arm 51 and accumulate therein to form bundles, which are manually removed therefrom. The adjustable bearing-plate 8 enables the carrier-chain to be kept at the requisite tension.

A flange-bar 55 is placed on the inner side of the bar 25 and overhangs the runway 27. This bar is of suitable shape in cross-section and prevents the stalks from being jerked too far through the runway by the revoluble stripper. Fig. 15 clearly shows this flange-bar.

Having thus described my invention, I claim—

1. In a machine of the class described, the combination with stripping mechanism, of a frame-bar, a guide-bar supported at a distance from the same and coacting therewith to form a fixed vertical runway open at both ends, arch-bars connecting the frame-bar with the guide-bar, and an endless carrier-chain having one lead disposed in said runway, said chain being provided with links having cross-heads that extend across said runway.

2. In a machine of the class described, the combination with stripping mechanism, of a frame-bar, a guide-bar supported at a distance from the same and coacting therewith to form a fixed vertical runway open at both ends, an endless carrier-chain having one lead disposed in said runway, said chain being provided with links having cross-heads supported upon the frame-bar and guide-bar.

3. In a machine of the class described, the combination with stripping mechanism, of a frame-bar, a guide-bar supported at a distance from the latter and coacting therewith to form a fixed runway open at both ends, an endless carrier-chain having one lead disposed in said runway, and a flange-bar upon the inner side of the guide-bar and coacting with the endless chain to pinch and grasp the cane that is to be operated upon.

4. In a machine of the class described, the combination with stripping mechanism, of a frame-bar, a guide-bar supported at a distance from the latter and coacting therewith to form a fixed runway open at both ends, an endless carrier-chain having one lead disposed in said runway and provided with links having cross-heads supported upon the frame-bar and guide-bar, and a guide forming a housing engaging the inner ends of said cross-heads.

5. In a machine of the class described, the combination with stripping mechanism, of a frame-bar, a guide-bar supported at a distance from the same and coacting therewith to form a fixed vertical runway open at both ends, an endless carrier-chain having one lead disposed in said runway and guiding means depending from the frame-bar and the guide-bar in front of the stripping mechanism.

6. In a machine of the class described, a fixed runway open at both ends, a carrier-chain having one lead disposed in said runway and provided with links having cross-heads extending across said runway, a flange-bar interiorly upon the latter and coacting with the carrier-chain to grasp the cane to be operated upon, rotary stripping mechanism disposed below the runway, and guiding means disposed in front of the stripping mechanism.

7. In a machine of the class described, the combination with a fixed runway and means for carrying the cane through the same, of a rotary stripping-wheel disposed below said runway and comprising a pair of disks having radially-extending stripping-spurs and laterally-extending stripping-springs, the latter extending across the space between the two disks.

8. In a machine of the class described, a stripping device comprising a pair of disks having radially-extending spurs and laterally-extending bent portions, tubular casings secured to the bent portions of said disks and having notched ends, and coiled springs mounted within said casings and having their inner ends fitted adjustably in the notches at the inner ends of said casings and having their outer ends extended across the space between the disks to form flexible stripping elements.

9. In a machine of the class described, the combination of a fixed runway, an endless movable carrier having one lead disposed in said runway, and provided with means to engage the cane, guides depending from said runway, on opposite sides thereof, and a revoluble stripper disposed in operative relation to said runway, guides and carrier, substantially as described.

10. In combination with a fixed runway, open at its receiving and discharge ends, a traveling carrier, coacting with the runway, and having means extending across the runway, to grasp the cane at the receiving end of the runway and release the cane at the discharge end thereof, and a stripper, across which the cane is drawn as it travels through the runway, substantially as described.

11. In combination with a fixed runway, open at its receiving and discharge ends, a traveling carrier, coacting with the runway and having means, extending across the runway, to grasp the cane at the receiving end of the runway and release the cane at the discharge end thereof, a stripper, across which the cane is drawn as it travels through the runway, and a header effective subsequently to the stripper, to head the cane, substantially as described.

12. In combination with means to convey and guide the cane, a revoluble stripper comprising a pair of disks, spaced apart and stripping-fingers operating between and carried by said disks, substantially as described.

13. In combination with means to convey and guide the cane, a revoluble stripper comprising a pair of disks spaced apart and spring stripping-fingers disposed in the space between said disks, substantially as described.

14. In combination with means to convey and guide the cane, a revoluble stripper comprising a pair of disks spaced apart and having peripheral spurs and stripping-fingers disposed in the space between said disks, substantially as described.

15. In a machine of the class described, the combination of a stripper, means to grasp the cane and carry the same obliquely across the stripper, the latter acting to strip the blades from the stalks, and a header to subsequently cut off the heads of the cane, substantially as described.

16. In a machine of the class described, the combination of a fixed runway, a stripper disposed below the same, means to carry the cane through the runway and across the stripper, and a cutter to cut off the heads of the stripped cane, substantially as described.

17. In a machine of the class described, the combination of a fixed runway, an endless traveling carrier to engage and carry stalks of cane, a stripper to and from which the stalks of cane are carried by said carrier and a heading-knife extending outwardly past the path of said carrier and coacting with said carrier, to cut off the heads of the cane, substantially as described.

In testimony that I claim the foregoing as my own I have hereto affixed my signature in the presence of two witnesses.

HARVEY H. MOHLER.

Witnesses:
WM. E. CRISSEY,
WM. H. MOHLER.